US009469749B2

(12) United States Patent
DeRocher et al.

(10) Patent No.: US 9,469,749 B2
(45) Date of Patent: Oct. 18, 2016

(54) PIGMENTED COATING COMPOSITION WITH A SULFONIC ACID FUNCTIONALIZED DISPERSANT AND A PHOSPHORUS ACID FUNCTIONALIZED BINDER

(71) Applicants: Dow Global Technologies LLC, Midland, MI (US); Rohm and Haas Company, Philadelphia, PA (US)

(72) Inventors: Jonathan DeRocher, Coopersburg, PA (US); Kevin J. Henderson, Phoenixville, PA (US); Lidaris San Miguel Rivera, Midland, MI (US); Anurima Singh, Audubon, PA (US); Antony K. Van Dyk, Blue Bell, PA (US); Tao Wang, Highton (AU)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/641,557

(22) Filed: Mar. 9, 2015

(65) Prior Publication Data
US 2015/0259561 A1   Sep. 17, 2015

Related U.S. Application Data

(60) Provisional application No. 61/952,240, filed on Mar. 13, 2014.

(51) Int. Cl.
*C08K 9/04* (2006.01)
*C09D 133/14* (2006.01)
*C09D 143/02* (2006.01)
*C08F 212/14* (2006.01)

(52) U.S. Cl.
CPC ............... *C08K 9/04* (2013.01); *C09D 133/14* (2013.01); *C09D 143/02* (2013.01)

(58) Field of Classification Search
CPC ..... C08K 9/04; C09D 133/14; C09D 143/02

USPC .......................................................... 524/521
See application file for complete search history.

(56) References Cited

U.S. PATENT DOCUMENTS

| 6,818,697 | B2 | 11/2004 | Zhang et al. | |
|---|---|---|---|---|
| 7,078,457 | B2 * | 7/2006 | Amick | C08F 4/34 524/556 |
| 7,179,531 | B2 | 2/2007 | Brown et al. | |
| 7,459,496 | B2 * | 12/2008 | Hsu | C08F 2/24 524/439 |
| 8,710,133 | B2 | 4/2014 | Bohling et al. | |
| 8,865,827 | B2 | 10/2014 | Henderson et al. | |
| 8,877,852 | B2 | 11/2014 | Bohling et al. | |
| 8,907,004 | B2 | 12/2014 | Henderson et al. | |
| 2003/0018103 | A1 | 1/2003 | Bardman et al. | |
| 2008/0269402 | A1 * | 10/2008 | Maurice | C08F 220/14 524/547 |
| 2014/0039115 | A1 * | 2/2014 | Henderson | C09D 141/00 524/502 |
| 2014/0056840 | A1 | 2/2014 | Balijepalli et al. | |
| 2014/0194566 | A1 | 7/2014 | Auld et al. | |

FOREIGN PATENT DOCUMENTS

| EP | 2692752 A1 | 2/2014 |
|---|---|---|
| EP | 2692753 A1 | 2/2014 |
| WO | 2008119887 A1 | 10/2008 |
| WO | 2013163808 A1 | 11/2013 |
| WO | 2014019184 A1 | 2/2014 |

* cited by examiner

*Primary Examiner* — Michael M Bernshteyn
(74) *Attorney, Agent, or Firm* — Reid Willis

(57) ABSTRACT

The present invention is a composition comprising a) a stable aqueous dispersion of polymer particles functionalized with structural units of a phosphorus acid monomer or a salt thereof and; b) a dispersion of pigment particles stabilized by an adsorbing water-soluble dispersant functionalized with structural units of a sulfonic acid monomer or a salt thereof. The composition of the present invention is useful in providing excellent storage stability for pigmented paints formulated with the sulfonic acid functionalized dispersant described herein.

16 Claims, No Drawings

PIGMENTED COATING COMPOSITION WITH A SULFONIC ACID FUNCTIONALIZED DISPERSANT AND A PHOSPHORUS ACID FUNCTIONALIZED BINDER

BACKGROUND OF THE INVENTION

The present invention relates to pigmented paint formulations containing a phosphorus acid functionalized latex binder and a polymeric dispersant for pigment that contains sulfonic acid groups or salts thereof.

The efficacy of the $TiO_2$ as a hiding pigment is reduced when $TiO_2$ particles are allowed to come too close together upon film formation and drying. It is known that the spacing of $TiO_2$ and its concomitant hiding efficiency can be improved with the aid of emulsion polymer particles adsorbed to the $TiO_2$ particle surface. (See US 2003/0018103). One of the potential problems observed with current adsorbing latex technology is slow adsorption kinetics between $TiO_2$ pigment and latex leading to viscosity instability of a formulated paint upon aging. This behavior is especially prominent when using pre-dispersed slurries of $TiO_2$. Such paints can demonstrate incomplete latex adsorption upon formulation, which results in continued latex adsorption in the paint can with accompanying viscosity rise. This viscosity instability alters the targeted rheological properties set by the formulator. It would therefore be desirable to discover a way to increase the initial latex adsorption for slow forming pre-composite technology to alleviate the viscosity instability with aging associated with continued latex adsorption.

SUMMARY OF THE INVENTION

The present invention addresses a need in the art by providing a composition comprising a) a stable aqueous dispersion of polymer particles functionalized with structural units of a phosphorus acid monomer or a salt thereof and; b) a dispersion of pigment particles stabilized by an adsorbing water-soluble dispersant functionalized with structural units of a sulfonic acid monomer or a salt thereof;

wherein the weight percent of the dispersant is from 0.1 to 10 percent, based on the weights of the dispersant and pigment particles;

wherein the weight percent of pigment particles is from 20 to 95 weight percent based on the weight of the polymer particles, the pigment particles, and the dispersant;

and wherein the weight percent of structural units of phosphorus acid monomer or a salt thereof is from 0.1 to 5 weight percent, based on the weight of the phosphorus acid functionalized polymer particles.

The composition of the present invention addresses a need by providing excellent storage stability for pigmented paints formulated with the adsorbing water-soluble sulfonic acid functionalized dispersant described herein.

DETAILED DESCRIPTION OF THE INVENTION

The present invention is a composition comprising a) a stable aqueous dispersion of polymer particles functionalized with structural units of a phosphorus acid monomer or a salt thereof and; b) a dispersion of pigment particles stabilized by an adsorbing water-soluble dispersant functionalized with structural units of a sulfonic acid monomer or a salt thereof;

wherein the weight percent of the dispersant is from 0.1 to 10 percent, based on the weights of the dispersant and pigment particles;

wherein the weight percent of pigment particles is from 20 to 95 weight percent based on the weight of the polymer particles, the pigment particles, and the dispersant;

and wherein the weight percent of structural units of phosphorus acid monomer or a salt thereof is from 0.1 to 5 weight percent, based on the weight of the phosphorus acid functionalized polymer particles.

As used herein, the term "phosphorus acid monomer" refers to a polymerizable compound containing at least one phosphorus atom and having at least one acidic proton. Examples of suitable classes of phosphorus acid monomers include phosphonic acid monomers and salts thereof and dihydrogen phosphate esters of an alcohol in which the alcohol contains or is substituted with a polymerizable vinyl or olefinic group, and salts thereof. Preferred dihydrogen phosphate esters are phosphates of hydroxyalkyl(meth)acrylates, including phosphoethyl methacrylate (PEM) and phosphopropyl methacrylates, with phosphoethyl methacrylate and salts thereof being especially preferred.

An example of a suitable phosphonic acid is 2-(methacryloyloxy)ethyl phosphonic acid or a salt thereof.

As used herein, the term "structural units" refers to the groups formed upon the polymerization of the recited monomer. A structural unit of a phosphoethylmethacrylate is illustrated:

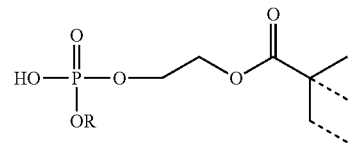

wherein the dotted lines represent the points of connectivity to the polymer backbone;
wherein R is H or

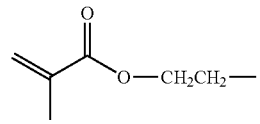

The dispersant functionalized with structural units of a sulfonic acid monomer or a salt thereof (the sulfonic acid functionalized polymer) is a water-soluble polymer that may be a homopolymer or a copolymer and preferably comprises at least 20, and more preferably at least 50 weight percent, to 100, more preferably to 95, and most preferably to 80 weight percent structural units of a sulfonic acid monomer or a salt thereof, based on the weight of the dispersant. Examples of suitable sulfonic acid monomers include 2-acrylamido-2-methylpropane sulfonic acid, vinyl sulfonic acid, 2-sulfoethyl acrylate, 2-sulfoethyl methacrylate, 3-sulfopropyl acrylate, 3-sulfopropyl methacrylate, sodium styrene sulfonate, and 2-propene-1-sulfonic acid, and salts thereof, and combinations thereof. A particularly preferred sulfonic acid monomer is 2-acrylamido-2-methylpropane sulfonic acid (AMPS) or a salt thereof.

The sulfonic acid functionalized polymer may further comprise structural units of one or more ancillary monomers, examples of which include acrylates and methacrylates such as methyl methacrylate, ethyl acrylate, butyl acrylate, ethyl hexyl acrylate, hydroxyethyl methacrylate and hydroxypropyl acrylates; dialkylaminoalkyl acrylates and methacrylates including 2-(N,N-dimethylamino)ethyl methacrylate (DMAEMA), 2-(N,N-dimethylamino)ethyl acrylate, 2-(N,N-diethylamino)ethyl methacrylate, 2-(N,N-diethylamino)ethyl acrylate 2-(t-butylamino) ethyl methacrylate, 3-(dimethylamino)propyl acrylate, 2-diisopropylaminoethyl methacrylate, and 3-dimethylaminoneopentyl acrylate; polyalkylene glycol acrylates and methacrylates including poly(ethylene glycol) methacrylate, poly(ethylene glycol) acrylate, and lauryl-O-$(CH_2CH_2O)_{23}$-methacrylate; dialkylaminoalkyl acrylamides and methacrylamides including N-[2(N,N-dimethylaminoethyl]methacrylamide, N-[3-(N,N-dimethylamino)propyl]acrylamide, and N-[3-(N,N-dimethylamino)propyl]methacrylamide; acrylamidotrialkylammonium halides including [2-(acryloxy)ethyl]trimethylammonium chloride, [2-(methacryloxy)ethyl] trimethylammonium chloride, and 3-methacrylamidopropyl)trimethylammonium chloride.

While it is permissible for the dispersant to comprise structural units of methacrylic acid or acrylic acid, it is preferred that this dispersant comprise less than 10, more preferably less than 5, and most preferably less than 2 weight percent structural units of these monocarboxylic acid functionalized monomers.

The dispersant preferably has a number average molecular weight ($M_n$) in the range of 500 to 20,000 g/mol to enable fast composite formation, water solubility and low viscosity. Preferably, the weight percent of the dispersant is from 0.4 to 2 weight percent based on the weight of the dispersant and pigment particles.

The stable aqueous dispersion of polymer particles functionalized with structural units of the phosphorus acid monomer or a salt thereof are preferably acrylic, styrene-acrylic, or vinyl ester-acrylic (more particularly vinyl acetate-acrylic) latex binders, and the polymer particles preferably further comprise structural units of one or more of the following monomers: methyl methacrylate, butyl acrylate, ethyl acrylate, 2-ethylhexyl acrylate, ureido methacrylate, styrene, vinyl acetate, and vinyl versatate. The phosphorus acid functionalized polymer may also include structural units of other monomers such as allyl methacrylate, divinyl benzene, acrylamide, and acetoacetoxyethyl methacrylate.

The weight percent of the phosphorus acid monomer is preferably from 0.2 weight percent to 4, more preferably to 2, and most preferably to 1.5 weight percent, based on the weight of the phosphorus acid monomer functionalized polymer particles.

The coatings compositions of the present invention are advantageously prepared by first dispersing pigment, preferably $TiO_2$, under high shear in the presence of stabilizing sulfonic acid containing dispersant to form a grind. The pigment may additionally be provided as a pre-dispersed slurry stabilized by a sulfonic acid containing dispersant, or the pigment may be distributed between multiple grinds or slurries comprising the sulfonic acid containing dispersant. These pigment dispersions are then contacted with a phosphorus acid functionalized dispersion of polymer particles to promote the adsorption of polymer particles onto the pigment surface. The composition may further comprise polymer particles that are not functionalized with structural units of phosphorus acid or salts thereof. It is also possible, though not preferred, to add the dispersion of polymer particles into the pigment dispersion. The mixture is then stirred sufficiently to maximize polymer particle adsorption onto pigment particles, followed by the addition of remaining paint ingredients. Alternatively, these ingredients may be added immediately after, during, or before the combination the dispersions of pigment and polymer particles. The sulfonic acid dispersant is believed to promote rapid polymer particle adsorption to pigment during the formulating of the paint, thereby increasing viscosity stability of the paint; in contrast, conventional dispersants inhibit rapid adsorption of polymer particles to the pigment particles, resulting in a relatively protracted formation of composite particles, which leads to an upward drift of viscosity in the paint formulation.

The aforementioned remaining paint ingredients include one or more of the following: rheology modifiers; opaque polymers; fillers; colorants, other pigments including encapsulated or partially encapsulated pigments and opaque pigments; non-sulfonic acid functionalized dispersants; wetting aids; dispersing aids; dispersant adjuvants; surfactants; co-solvents; coalescing agents and plasticizers; defoamers; preservatives; anti-mar additives; flow agents; leveling agents; slip additives; and neutralizing agents.

EXAMPLES

Abbreviations

| 2-Acrylamido-2-methylpropane sulfonic acid | AMPS |
| Butyl Acrylate | BA |
| Hydroxypropyl Acrylate | HPA |
| Methacrylic Acid | MAA |
| Methyl Methacrylate | MMA |
| Phosphoethylmethacrylate | PEM |
| Ureido Methacrylate | UMA |
| Sodium styrene sulfonate | SSS |
| Styrene | STY |

In the following examples, ACRYSOL™, TERGITOL™, ROCIMA™, AMP-95™, and TAMOL™ are all Trademarks of The Dow Chemical Company or Its Affiliates.

As used herein the term $M_n$ refers to the number average molecular weight of the dispersant as determined by the following method:

Non-amphoteric dispersants are dissolved at a concentration of 2 mg/mL in a 20 mM solution of sodium dihydrogen phosphate at pH 7 and passed through a 0.45 µm filter and 100 µL injected into a TSKgel GMPW XL packed column (7.5 mm×30 cm, Tosoh) in tandem with a TSKgel G2500PW XL packed column (7.5 mm×30 cm, Tosoh) at a flow rate of 1 mL/min. The elution is monitored by a refractive index detector and molecular weight profile assessed versus poly(acrylic acid) reference standards ranging in molecular weight from 216 g/mol to 1,100,000 g/mol.

Amphoteric dispersants are hydrolyzed at a concentration of 50 mg/mL in a solution of KOH dissolved in ethanol (100 mg/mL) and heated to 180° C. for 7 days in a sample preparation bomb pressure vessel (Paar). The dispersants are then recovered by decanting the KOH ethanol solution, rinsing in ethanol, and drying at 50° C. The molecular weight profile is characterized using the same procedure described for the non-amphoteric samples. The original molecular weight of the starting amphoteric material may be estimated using the known weight fractions of substituent materials compared to the resulting hydrolyzed structure.

EXAMPLES

A water-soluble sulfonic acid functionalized dispersant (63% AMPS/37% HPA by weight, 4.84 g, 30% solids, $M_w$=3300 g/mol; $M_n$=630 g/mol) was synthesized by freeradical polymerization for the examples shown. It is hereinafter referred to as AMPS-HPA.

Example 1

2.3% PEM Styrene Acrylic Binder and 0.5% AMPS-HPA

A. Preparation of Binder

The binder was prepared following the procedure described for Latex 1 in US 2008/0269402, but adjusting the composition to 56% BA, 41.2% ST, 0.3% SSS, 0.2% MAA, and 2.3% PEM (60% active). Additionally, no sodium carbonate buffer was used in the kettle, and the final percent solids of the prepared binder was 46%.

B. Paint Formulation

1. Grind Preparation

Water (60.0 g), AMPS-HPA (10.0 g, 30% solids), Surfonyl CT-221 surfactant (3.0 g), BYK-022 defoamer (2.0 g), and AMP-95 neutralizing base (0.5 g) were mixed in a steel grind pot using a high speed disperser. Tiona 595 titanium dioxide (330.0 g, Cristal), Omyacarb 5 calcium carbonate extender (100.0 g, Omya), Minex 4 nepheline syenite extender (130.0 g) were then added and mixed for about 10 min to fully disperse the pigments. Water (50.0 g) and ROCIMA™ 630 Biocide (2.0 g) were then added to complete the grind.

2. Letdown

The grind from B1 was added to binder (504.5 g) while mixing. Texanol Coalescent (7.0 g), Foamaster VL Defoamer (2.0 g), AMP-95 Neutralizing base (1.0 g), water (195.3 g), ACRYSOL RM-5000 Rheology modifier (22.0 g), Rhodafac RS-710 Surfactant (3.0 g), and Natrosol Plus 330 Rheology modifier (1.5 g) were added with mixing to complete the formulation.

Comparative 1

2.3% PEM Styrene Acrylic Binder and 0.5% TAMOL 1124 Dispersant

A. Preparation of Binder

The binder was prepared as described for Example 1A.

B. Paint Formulation

The grind was prepared as described for Example 1 except that AMPS-HPA was replaced with TAMOL™ 1124 dispersant (6.0 g) and the second water addition was 30.0 g. The letdown was prepared in the same way except that the amount of water was increased to 215.8 g and ACRYSOL™ TT-935 rheology modifier (3.0 g) was added.

Example 2

1.8% PEM Styrene Acrylic Binder and 0.5% AMPS-HPA

A. Preparation of Binder

The binder was prepared following the procedure described for Latex 1 in US 2008/0269402, but adjusting the composition to 56% BA, 41.2% ST, 0.6% SSS, and 1.8% PEM (60% active). Additionally, no sodium carbonate buffer was used in the kettle, and the final percent solids of the prepared binder was 48%.

B. Paint Formulation

The formulation was prepared as described in Example 1B except that the amount of binder used was 490.5 g and the water used was 206.8 g.

Comparative 2

1.8% PEM Styrene Acrylic Binder and 0.5% TAMOL 1124 Dispersant

A. Preparation of Binder

The binder was prepared as described for Example 2A.

B. Paint Formulation

The formulation was prepared as described in Example 2B except that the amount of water used was 227.2 g.

Example 3

2.3% PEM Bimodal Acrylic Binder and 0.5% AMPS-HPA

A. Preparation of Binder

The binder was prepared following the procedure described for Example 4 in US 6,818,697 B2 adjusting the composition to 49.6% BA/48.1% MMA/2.3% PEM (60% active)/1.0% UMA.

Additionally, the neutralization was carried out using a solution of sodium hydroxide, and the final percent solids of the prepared binder was 50%.

B. Paint Formulation

The formulation was prepared as described in Example 1B except that the amount of binder used was 460.3 g, the amount of TEXANOL coalescent was increased to 14.0 g, and the water used was 241.6 g.

Comparative 3

2.3% PEM Bimodal Acrylic Binder and 0.5% TAMOL 1124 Dispersant

A. Preparation of Binder

The binder was prepared as described for Example 3.

B. Paint Formulation

The formulation was prepared as described in Example 3 except that the amount of water used was 260.1 g.

Viscosity Measurements and Heat Age:

One liter samples of the paints were made, divided, and filled into 250 mL containers. Viscosity was measured at 25° C. with a BYK KU-2 Stormer type viscometer (BYK-Gardner GmbH•Lausitzer Strasse 8•82538 Geretsried•Germany•Tel +49 8171 3493-0) and measurements made according to ASTM D562. Initial measurements were made within 2 hr of batch completion; 1-day measurements were made after equilibrating the samples at 25° C. for 1 day; 10-day measurements were made after equilibrating the samples at 25° C. for 10 days; and heat age measurements were made after storing the samples at 60° C. for 10 days followed by adjustment to 25° C. for measurement. The final value of viscosity rise, $\Delta KU$, is given by the difference between the heat age measurement, and the initial measured viscosity. The results of viscosity measurements are summarized in Table 1.

TABLE 1

Equilibrated and heat age viscosity for example and comparative samples

| | Viscosity (Krebs-Stormer Units, KU) | | | | |
|---|---|---|---|---|---|
| | Initial | 1-day | 10-day | Heat Age | $\Delta KU$ |
| Example 1 | 111 | 111 | 111 | 110 | −1 |
| Example 2 | 114 | 113 | 112 | 112 | −2 |

TABLE 1-continued

Equilibrated and heat age viscosity for example and comparative samples

| | Viscosity (Krebs-Stormer Units, KU) | | | | |
|---|---|---|---|---|---|
| | Initial | 1-day | 10-day | Heat Age | ΔKU |
| Example 3 | 100 | 105 | 108 | 109 | 9 |
| Comp. 1 | 111 | 116 | 121 | 127 | 16 |
| Comp. 2 | 109 | 113 | 119 | 124 | 15 |
| Comp. 3 | 105 | 116 | 128 | 138 | 33 |

For the three different binders used for Comparative Examples 1-3, the use of TAMOL 1124 Dispersant results in considerable viscosity drift between the initial formulation of the paint and the final heat aged sample. All of the comparative samples demonstrate a ΔKU of 15 or greater, with Comparative 3 demonstrating a KU rise of 33 KU. In contrast, paints formulated with a dispersant described in the context of the present invention all demonstrate a ΔKU less than 10, representing paint compositions with relatively stable viscosity profiles. Example 1 and Example 2 show only a very slight change in KU, especially in view of their corresponding comparative examples, Comparative 1 and Comparative 2, respectively. Example 3, though having a larger ΔKU of 9, demonstrates a reduction of 24 KU units in view of its counterpart, Comparative Example 3.

The invention claimed is:

1. A composition comprising a) a stable aqueous dispersion of polymer particles functionalized with structural units of a phosphorus acid monomer or a salt thereof and; b) a dispersion of pigment particles stabilized by an adsorbing water-soluble dispersant functionalized with structural units of a sulfonic acid monomer or a salt thereof;
    wherein the weight percent of the dispersant is from 0.1 to 10 percent, based on the weights of the dispersant and pigment particles;
    wherein the weight percent of pigment particles is from 20 to 95 weight percent based on the weight of the polymer particles, the pigment particles, and the dispersant;
    and wherein the weight percent of structural units of phosphorus acid monomer or a salt thereof is from 0.1 to 5 weight percent, based on the weight of the phosphorus acid functionalized polymer particles.

2. The composition of claim 1 wherein the water-soluble dispersant is functionalized with 20 to 95 weight percent of the sulfonic acid monomer, based on the weight of the dispersant.

3. The composition of claim 2 wherein the weight percent of the dispersant is from 0.4 to 2 weight percent based on the weight of the dispersant and the pigment particles, wherein the pigment particles comprise TiO$_2$ particles.

4. The composition of claim 3 wherein the phosphorus acid monomer or salt thereof is phosphoethyl methacrylate or 2-(methacryloyloxy)ethyl phosphonic acid or salts thereof, wherein the weight percent of structural units of phosphorus acid monomer or a salt thereof is from 0.2 to 2 weight percent, based on the weight of the phosphorus acid functionalized polymer particles.

5. The composition of claim 4 wherein the water-soluble dispersant comprises from 50 to 95 weight percent structural units of the sulfonic acid monomer or a salt thereof and from 5 to 50 weight percent structural units of one or more ancillary monomers selected from the group consisting of methyl methacrylate, ethyl acrylate, butyl acrylate, ethyl hexyl acrylate, hydroxyethyl methacrylate, and hydroxypropyl acrylates, based on the weight of the sulfonic acid monomer or salt thereof and the one or more ancillary monomers.

6. The composition of claim 5 wherein the sulfonic acid monomer or salt thereof is 2-acrylamido-2-methylpropane sulfonic acid or a salt thereof and the ancillary monomer comprises 2-hydroxypropyl acrylate.

7. The composition of claim 1 wherein the stable aqueous dispersion of polymer particles is an acrylic, styrene-acrylic, or vinyl ester latex, and the polymer particles further comprise structural units of one or more monomers selected from the group consisting of methyl methacrylate, butyl acrylate, ethyl acrylate, 2-ethylhexyl acrylate, ureido methacrylate, styrene, vinyl acetate, and vinyl versatate.

8. The composition of claim 1 which further includes one or more materials selected from the group consisting of rheology modifiers; opaque polymers; fillers; colorants, non-sulfonic acid functionalized dispersants; wetting aids; dispersing aids; dispersant adjuvants; surfactants; co-solvents; coalescing agents and plasticizers; defoamers; preservatives; anti-mar additives; flow agents; leveling agents; slip additives; and neutralizing agents.

9. A composition comprising a) a stable aqueous dispersion of polymer particles functionalized with structural units of a phosphorus acid monomer or a salt thereof and; b) a dispersion of pigment particles stabilized by an absorbing water-soluble dispersant functionalized with structural units of a sulfonic acid monomer or a salt thereof;
    wherein the weight percent of the dispersant is from 0.1 to 10 percent, based on the weights of the dispersant and pigment particles;
    wherein the weight percent of pigment particles is from 20 to 95 weight percent based on the weight of the polymer particles, the pigment particles, and the dispersant;
    and wherein the weight percent of structural units of phosphorus acid monomer or a salt thereof is from 0.2 to 5 weight percent, based on the weight of the phosphorus acid functionalized polymer particles.

10. The composition of claim 9 wherein the water-soluble dispersant is functionalized with 20 to 95 weight percent of the sulfonic acid monomer, based on the weight of the dispersant.

11. The composition of claim 10 wherein the weight percent of the dispersant is from 0.4 to 2 weight percent based on the weight of the dispersant and the pigment particles, wherein the pigment particles comprise TiO$_2$ particles.

12. The composition of claim 11 wherein the phosphorus acid monomer or salt thereof is phosphoethyl methacrylate or 2-(methacryloyloxy)ethyl phosphonic acid or salts thereof, wherein the weight percent of structural units of phosphorus acid monomer or a salt thereof is from 0.2 to 2 weight percent, based on the weight of the phosphorus acid functionalized polymer particles.

13. The composition of claim 12 wherein the water-soluble dispersant comprises from 50 to 95 weight percent structural units of the sulfonic acid monomer or a salt thereof and from 5 to 50 weight percent structural units of one or more ancillary monomers selected from the group consisting of methyl methacrylate, ethyl acrylate, butyl acrylate, ethyl hexyl acrylate, hydroxyethyl methacrylate, and hydroxypropyl acrylates, based on the weight of the sulfonic acid monomer or salt thereof and the one or more ancillary monomers.

14. The composition of claim 13 wherein the sulfonic acid monomer or salt thereof is 2-acrylamido-2-methylpropane sulfonic acid or a salt thereof and the ancillary monomer comprises 2-hydroxypropyl acrylate.

15. The composition of claim 9 wherein the stable aqueous dispersion of polymer particles is an acrylic, styrene-acrylic, or vinyl ester latex, and the polymer particles further comprise structural units of one or more monomers selected from the group consisting of methyl methacrylate, butyl acrylate, ethyl acrylate, 2-ethylhexyl acrylate, ureido methacrylate, styrene, vinyl acetate, and vinyl versatate.

16. The composition of claim 9 which further includes one or more materials selected from the group consisting of rheology modifiers; opaque polymers; fillers; colorants, non-sulfonic acid functionalized dispersants; wetting aids; dispersing aids; dispersant adjuvants; surfactants; co-solvents; coalescing agents and plasticizers; defoamers; preservatives; anti-mar additives; flow agents; leveling agents; slip additives; and neutralizing agents.

* * * * *